J. L. AND A. C. VAUCLAIN.
MILLING CUTTER.
APPLICATION FILED MAR. 3, 1921.
1,432,579. Patented Oct. 17, 1922.
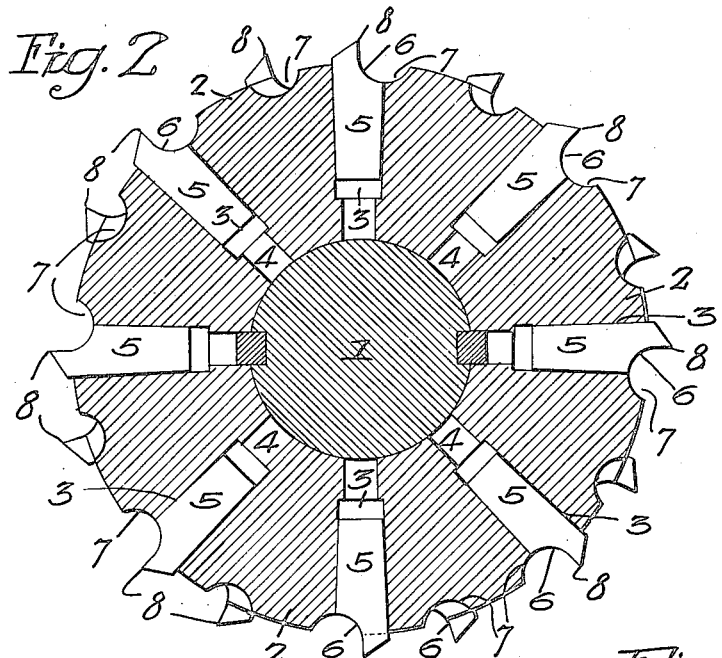
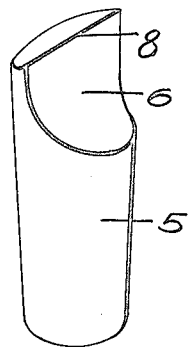
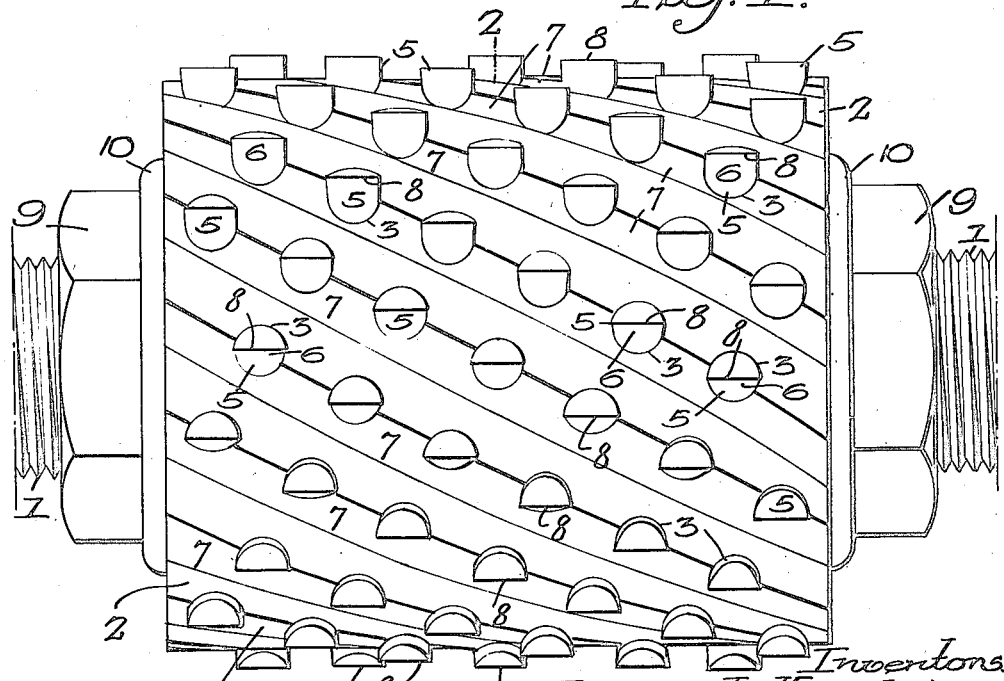

Patented Oct. 17, 1922.

1,432,579

UNITED STATES PATENT OFFICE.

JACQUES L. VAUCLAIN, OF HAVERFORD, AND ANDREW C. VAUCLAIN, OF PHILADELPHIA, PENNSYLVANIA.

MILLING CUTTER.

Application filed March 3, 1921. Serial No. 449,287.

*To all whom it may concern:*

Be it known that we, JACQUES L. VAUCLAIN and ANDREW C. VAUCLAIN, citizens of the United States, residing in Haverford, Pennsylvania, and Philadelphia, Pennsylvania, respectively, have invented the Improvements in Milling Cutters, of which the following is a specification.

Our invention relates to certain improvements in milling cutters of the type in which insertable teeth are mounted in a cylindrical body.

One object of our invention is to produce a cutter of this type, which will be simple in construction and in which the teeth can be driven into position and held therein by friction.

A further object of the invention is to provide means for forming a gullet in front of the teeth, the gullet being formed partly in the teeth and partly in the cylinder so as to allow for the removal of chips and to locate the teeth in the cylinder so that the cut will be resisted by the body of the cylinder.

In the accompanying drawings:

Fig. 1 is a side view of our improved milling cutter;

Fig. 2 is a sectional view on the line 2—2, Fig. 1; and

Fig. 3 is a perspective view of one of the teeth.

Referring to the drawings, 1 is a spindle on which is mounted a cylindrical body 2. This body is keyed to the spindle, as clearly shown in Fig. 2. In the body is a series of radial, tapered sockets 3 reduced at 4, at the point where they near the opening for the spindle so as to avoid cutting away too much of the body at this point. The taper of the sockets is very slight so that the teeth 5, which are tapered to correspond to the taper of the sockets, can be driven into the sockets, the friction preventing the teeth turning in the sockets without fastening devices.

Each tooth is cut away at 6 to form a portion of a gullet, the main gullet being formed by grooves 7 extending from end to end of the body of the cutter, as shown in Fig. 1, so that when the teeth are assembled, as indicated in the drawings, there is sufficient space for the chips as they are cut.

By this construction, we are enabled to drive the teeth into the body to a greater depth than heretofore and to provide sufficient clearance for the chips. This enabled us to support the teeth properly in the rear and to increase the cutting capacity of the tool.

It will be noticed that the cutting edge 8 of each tooth is parallel with the center line of the spindle and the teeth of one row overlap those of the other row so that a clear cut is made without fins or rough edges. By arranging the cutting edges of each tooth parallel with the center line of the spindle, a substantial tooth can be made, which can be readily sharpened without materially changing its width, and which will not bend or break at the ends as the full width of the cutting edge is supported by the body of the tooth. The teeth are helically arranged on the face of the cutter so that one tooth is slightly in advance of another. The teeth of one series are preferably out of line with those of another series so as to reduce the strain on the cutter as a whole. Consequently, a much heavier cut can be made than where a number of teeth are cutting at the same time.

The gullets formed in the body are also on substantially the same helix as the arrangement of the teeth and by arranging them in this manner the chips more readily free themselves from the cutter. The cutter is held to the spindle by nuts 9 and washers 10, which are mounted on the threaded portions of the spindle 1, as clearly shown in Fig. 1. Other means of attaching the body of the cutter to the spindle may be resorted to without departing from the essential features of the invention.

Each tooth is beveled at the back to provide clearance and the teeth are so proportioned in respect to the body portion that when they are driven into place the back of each tooth projects slightly beyond the surface of the body portion in order that the body portion will resist the strains on the teeth, the gullets in front allowing for this construction to provide free escape for the chips.

We claim:

1. The combination of a spindle; a cutter body mounted thereon so as to turn with said spindle and having a series of radial sockets, each socket being slightly tapered and having a series of grooves cut in its face forming gullets for the escape of chips;

and tapered teeth driven into the sockets and having cutting faces in close proximity to the grooves.

2. The combination in a cutter, of a body having a series of radial sockets, each socket being slightly tapered; a series of helical grooves in the face of the body and cutting through the sockets; and tapered teeth driven into the sockets and grooved at the face to form, with the grooves of the body, gullets for the escape of chips.

3. The combination of a spindle; a cylindrical body mounted on the spindle, said body having a series of radial sockets, each socket being slightly tapered; helical grooves in the periphery of the body, said grooves cutting through the sockets; tapered teeth driven into the sockets to such an extent that the upper edge of the back of each tooth is slightly beyond the surface of the body, each tooth being cut away to form a cutting edge; and a gullet which, with the grooves in the body, allows for the escape of chips from the cutter.

4. The combination in a cutter, of a spindle; a body secured to the spindle, said body having a series of radial sockets, each socket being slightly tapered and reduced at its inner end; and a series of short tapered teeth driven into the sockets and stopping short of the reduced portions of the sockets, each tooth having a gullet at the front of the cutting edge to allow for the escape of chips, the back of the teeth projecting slightly above the surface of the body.

5. The combination in a cutter, of a spindle; a body secured thereto and having a series of radial sockets, each socket extending to the spindle and slightly tapered; helical grooves extending through the several sockets, each longitudinal series of sockets being set, one slightly in advance of the other, and the sockets of one series being back of the space between those of an adjoining series; and tapered teeth mounted in each socket and recessed in front of the cutting edge, said teeth being beveled at the back to provide clearance, the back of the teeth extending slightly beyond the surface of the body portion, the parts being so arranged that the cut made by one series of teeth will overlap that made by another series and the cutters of each series will be in action at one time.

JACQUES L. VAUCLAIN.
ANDREW C. VAUCLAIN.